Figure 1:
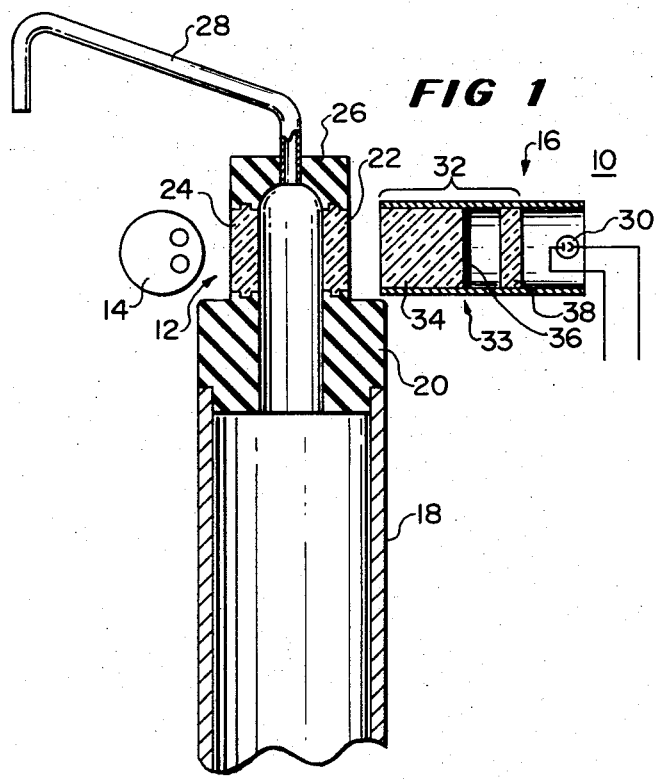

United States Patent [19]

Allington

[11] 3,866,049

[45] Feb. 11, 1975

[54] LIGHT SOURCE

[75] Inventor: Robert W. Allington, Lincoln, Nebr.

[73] Assignee: Instrumentation Specialties Company, Lincoln, Nebr.

[22] Filed: Mar. 9, 1973

[21] Appl. No.: 339,570

[52] U.S. Cl. .................................. 250/487, 250/372
[51] Int. Cl. ................................................ F21v 9/16
[58] Field of Search .......... 250/361, 363, 365, 368, 250/369, 372, 483, 458, 461, 462, 487

[56] References Cited
UNITED STATES PATENTS

| 2,245,843 | 6/1941 | Wesch | 250/483 |
| 2,315,328 | 3/1943 | Hood et al. | 250/483 X |
| 2,716,082 | 8/1955 | Smith | 250/483 X |
| 2,857,541 | 10/1958 | Etzel et al. | 250/361 X |
| 3,546,460 | 12/1970 | Lally | 250/483 |
| 3,743,833 | 7/1973 | Martic et al. | 250/483 |

OTHER PUBLICATIONS

Handbook of Chemistry and Physics, 47th ed., The Chemical Rubber Co., Cleveland, 1966, pp. B-241, E-152.

Primary Examiner—Ronald L. Wibert
Assistant Examiner—Matthew W. Koren
Attorney, Agent, or Firm—Vincent L. Carney

[57] ABSTRACT

A filter light source within a compound optical filter includes a flat sheet consisting of a plurality of fine particles of a phosphor in a transparent matrix having a refractive index greater than that of air but less than that of the particles. To measure the absorbance of light by a fluid, light that has passed from a primary light source through the fluid is transmitted by an interference filter in the compound filter to the filter light source. The phosphor has a high excitation efficiency at the wavelength of light that is transmitted by the interference filter and a high emission efficiency for light with a longer wavelength, which light is reflected by the interference filter, with both the reflected light and directly emitted light being transmitted in the direction of a photocell.

10 Claims, 2 Drawing Figures

PATENTED FEB 11 1975 3,866,049

LIGHT SOURCE

This invention relates to light sources which are especially useful as part of compound optical filters.

One class of light source includes a sheet of fluorescent material which receives light of a first frequency and emits light of a second frequency. To avoid having large amounts of the light flux conducted along the sheet to the edges, which may happen with some crystals that act as light conductors, the sheet is formed of a plurality of small phosphor particles.

One class of compound optical filter includes at least two filter elements, with the second filter element, which is a luminescent phosphor, being positioned behind the first filter element which is an absorbance filter element that passes light having a first wavelength within the excitation of a second filter element, the second filter element emitting light primarily of a second wavelength different from the light passed by the first filter element.

In one type of prior art light source in the above-described class, the particles of phosphor form a thin coat on a substrate. It has been proposed to include a transparent substrate so that light of a first frequency passes through the substrate and impinges upon the phosphor which emits light of a second frequency, a portion of which is emitted away from the substrate.

In one type of prior art compound optical filters of the above-described class, the first filter element is an absorbance filter which absorbs light having a wavelength shorter than the first wavelength. The second filter element has an excitation spectrum that includes light having a wavelength above the lower cutoff wavelength of the first filter element and emits light having a wavelength longer than the first wavelength toward a photocell. A third filter element, positioned behind the second filter element, absorbs substantially all of the light that passes through the first filter element and is not absorbed by the second filter element so that only the light emitted by a second filter element is passed to the photocell.

The proposed type of light source has the disadvantage of emitting an undesirably low proportion of light in the desired direction, which is orthogonal to the plane of the sheet of phosphor and away from the substrate, with some light being directly emitted in other directions by the particles and some light that is directly emitted in the desired direction by the particles being backscattered. The problem of back-scattering is increased because more light is emitted from the phosphor particles nearest the substrate than from particles furthest from the substrate.

The prior art type of compound optical filter has several disadvantages, such as: (1) it has relatively low efficiency because light from the phosphor is emitted with equal intensity in all directions, causing a portion of the light to be emitted in directions away from the third filter element and the photocell; (2) for some applications, it is difficult to select a phosphor having a maximum excitation wavelength close to the first wavelength and a high emission efficiency at a wavelength suitable for use with the selected photocell; (3) it is difficult to design compound optical filters of the prior art type that effectively remove 254 nanometer wavelength light, which is one wavelength of light emitted with particularly high efficiency from low pressure mercury lamps used in chemical analyzing apparatus such as scanning apparatus for chromatographic columns and density gradient columns; (4) if the photocell is a photoresistor, its response is undesirably slow because the light intensity reaching the photocell is low due to the low efficiency of the filter; and (5) if the photocell is photoemissive, there is an undesirably high electrical noise level because the light intensity reaching the photocell is low due to the low efficiency of the filter:

A light source and a compound optical filter described in a co-pending application to Robert W. Allington U.S. Pat. application No. 331,571, filed Feb. 12, 1973 for Optical Filter and assigned to the same assignee as this application, now abandoned. reduce this disadvantages by including an interference filter as the first filter element with a fluorescent material positioned against the interference filter. The interference filter passes light having a wavelength which meets two criteria, which are: (1) it is useful in monitoring the absorbance or transmittance of the fluid flowing through the flow cell; and (2) it falls within a high amplitude portion of the excitation spectrum of the fluorescent material. The fluorescent material emits light in response to light passing through the interference filter, which light is of a different wavelength. The fluorescent material is selected so that the wavelength emitted by it is reflected by the reflective surfaces of the interference filter and falls within a range readily detected by the photocell.

While this type of light source and filter have shown themselves to be generally superior to many other types of prior art light sources and compound optical filters, it has been found in the course of further experimentation that they can be still further improved by (1) reducing the amount of light which is backscattered; (2) increasing the proportion of backscattered light that is reflected from the reflective layers of interference filter toward the photocell; and (3) shifting the central wavelength of the light from the light source to a wavelength more suitable for use by chemical analyzers in certain studies.

Accordingly, it is an object of the invention to provide a novel light source.

It is a further object of the invention to provide a novel optical filter.

It is a still further object of the invention to provide a light source having phosphor particles which light source emits a high portion of light in a selected direction.

It is a still further object of the invention to provide a light source having phosphor particles which light source has low backscattering.

It is a still further object of the invention to provide a compound optical filter having high efficiency.

It is a still further object of the invention to provide an optical filter which utilizes a large amount of the light emitted by a phosphor.

It is a still further object of the invention to provide an optical filter which directs light emitted in a large solid angle about a light source in the filter along a smaller solid angle.

It is still further object of the invention to provide a novel compound optical filter in which the reflective properties of an interference filter are utilized to increase the effectiveness of the novel compound optical filter.

It is a still further object of the invention to provide apparatus for filtering spurious signals from optical scanning equipment.

It is a still further object of the invention to provide apparatus for shifting the central wavelength of light applied to a photocell by a compound optical filter.

It is a still further object of the invention to provide apparatus for chemical-analyzer scanning equipment that has a relatively fast response time and a low noise level.

In accordance with the above and further objects of the invention, a light source and compound optical filter using the light source are provided for receiving light from a primary source of ultraviolet light after the ultraviolet light has passed through a flow cell and for providing light from the light source within the filter to a photoresistive element, the intensity of which indicates the light absorbance of a fluid passing through the flow cell.

The compound optical filter includes an interference filter and a fluorescent material, with the fluorescent material comprising a plurality of fine fluorescent particles embedded in a transparent matrix either coated directly against the interference filter or spaced a sufficiently short distance therefrom as to reflectively overlie the interference filter. The interference filter passes light having a wavelength which meets two criteria, which are: (1) it is useful in monitoring the absorbance or transmittance of the fluid flowing through the flow cell; and (2) it falls within a high amplitude portion of the excitation spectrum of the fluorescent particles.

The fluorescent particles backscatter light transmitted by the interference filter and emit light in response to the transmitted light, which emitted light is of a different wavelength than the light transmitted by the interference filter. The fluorescent particles are selected so that the wavelengths of light emitted by them are reflected by the reflective surfaces of the interference filter and fall within a range readily detected by the photocell.

The transparent matrix is selected to have a refractive index greater than that of air but less than that of the fluorescent particles so that light propagated over a long distance, such as in the plane of the surface of the layer of particles, is scattered out of that plane, increasing the amount of light that is (1) backscattered against the reflective surfaces of the interference filter; (2) scattered forward toward the photocell; and (3) scattered radially out of planes substantially parallel to the surface of the interference filter.

In one embodiment, the compound optical filter is utilized with a primary light source that includes microcrystalline lanthanum fluoride with cerium activation. This type of light source provides light having a central wavelength slightly longer than that desired in certain studies. The fluorescent particles of the compound optical filter, when embedded in the transparent matrix, shift the central frequency of system response to one that is better suited for the studies because the long-wave cutoff wavelength of the optical filter is shortened.

In operation, a narrow range of wavelengths of light from the light passing through the flow cell is transmitted by the interference filter to the layer of fine fluorescent particles on the opposite side of the interference filter which emit light of a longer wavelength in response to some of the light passing through the interference filter, with a portion of the emitted light being transmitted directly in the direction of the photocell and a portion being directed toward the interference filter, which reflects it in the direction of the photocell. The fine particles and matrix in which they are embedded increase the efficiency of the optical filter.

Because of the multicrystalline powder nature of the phosphor, some of the light emitted from a fluorescent emitting location in the phosphor, regardless of the direction in which it is emitted, is backscattered (scattered toward the interference filter) by the phosphor and is reflected back toward the photocell by the interference filter, but light that is emitted or scattered in a direction parallel to the interference filter is not directly reflected from the interference filter toward the photocell.

The irregular surfaces formed by the fine fluorescent particles rescatter some of the light that has been scattered in a direction substantially parallel to the interference filter. A portion of this scattered light is backscattered in the direction of the reflective surfaces of the interference filter or forwardscattered (scattered directly toward the photocell), thus increasing the efficiency of the filter.

The transparent matrix reduces the backscattering to an optimum amount so that a maximum amount of light eventually propogates in the direction of the photocell to reach the photocell without further scattering. If the backscattering is too great, the light of a fluorescent origin tends to be reflected back and forth between the reflective layers of the interference filter and the light-scattering multicrystalline phosphor a large number of times, losing a certain proportion of its intensity with each reflection, thus decreasing the efficiency of the filter. The loss in intensity is even greater if an absorbtion type filter is used instead of an interference filter since very little backscattered light is reflected back toward the phosphor for a second possible penetration of the phosphor layer when an absorbance type filter is used.

It has also been discovered that the central frequency of the excitation spectrum of fine fluorescent particles embedded in a transparent matrix is different from the central frequency of the excitation spectrum of the fluorescent particles when not embedded in the matrix. It is not known why this occurs, but it is believed that the shift in the central frequency of the excitation spectrum occurs because light from the optical cell of a wavelength that is at the edge of the excitation spectrum (which is frequently also the edge of the absorbance spectrum) of the phosphor undergoes less multiple scattering at individual microcrystals of the phosphor when the transparent matrix is included, thus decreasing the probability that light of such a wavelength will excite fluorescence. The effect of this difference in the amount of scattering between wavelengths that are near the edge of the excitation spectrum and wavelengths that are at a more efficient location of the excitation spectrum is to sharpen or shift the edge of the excitation spectrum closer to the center of the excitation spectrum.

With certain types of particles, this shift in the central frequency is advantageously utilized to prove the efficiency of optical cells used for scanning fluids in chemical analyzers.

For example, in an embodiment in which the primary light source includes a phosphor of microcrystalline lanthanum fluoride with cerium activation as described in U.S. Pat. No. 2,450,548 to Gishoff, the light applied to the compound optical filter has a central wavelength that is slightly longer than 280 manometers. It is desirable to utilize 280 nanometers light to excite the fluorescent particles since the light absorbance of solutions of proteins are relatively constant to this wavelength of light as the pH of the solution varies. The light spectrum distribution, which has a slightly longer peak wavelength than 280 nanometers, is shifted in the direction of 280 nanometers by the shortened and sharpened excitation spectrum edge when the particles are embedded in a transparent matrix having a refractive index greater than that of air but less than that of the fluorescent particles. This has been found particularly useful when these particles are composed of manganese activated zinc silicate.

The compound optical filter has the advantage of utilizing a larger portion of the light emitted by the fluorescent particles because the backscattering of light is reduced to an optimum amount by the transparent matrix in which the particles are embedded and the backscattering by the particles increases the portion of light that is reflected by the reflective layers of the interference filter without unduly backscattering the light on the second pass through the phosphor particle layer. It has a further advantage when used in an embodiment of optical scanners that may be utilized to scan protein solutions using a light source which provides a wavelength of light to the optical filter that has a central wavelength slightly longer than the wavelength that is desired because the central wavelength response is shifted to a shorter wavelength than would be the case without the transparent matrix.

Figure 2:
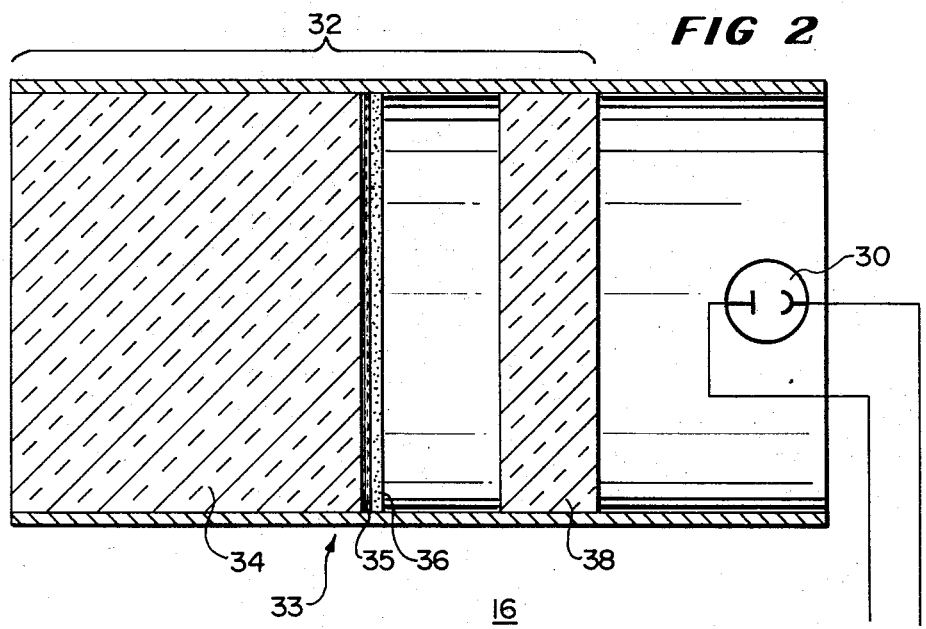

The above noted and further objects of the invention will be better understood from the following detailed description when considered with reference to the accompanying drawings in which:

FIG. 1 is a diagrammatic sectional view of an optical cell including an optical filter in accordance with an embodiment of the invention; and FIG. 2 is a diagrammatic view of a compound optical filter and photocell arrangement useful in the optical cell of FIG. 1 in accordance with an embodiment of the invention.

In FIG. 1 there is shown an optical flow cell 10 having a viewing station 12, a source of illumination 14 positioned on one side of the viewing station 12, and an optical detector 16 positioned on the other side of the viewing station 12.

The viewing station 12 is a portion of a chemical separation or analysis apparatus having a flow tube 18 communicating at its lower end with a source of a fluid to be monitored such as the fluid from a density gradient column and communicating at its upper end with a bushing 20, with the viewing station 12 being mounted above the bushing 20 and having a pair of oppositely disposed viewing windows 22 and 24 positioned in line with the source of illumination 14 and the optical detector 16 to permit light to pass from the source of illumination 14 through the viewing station 12 and into the aperture of the optical detector 16. Above the viewing station 12 is a cap 26 which receives a delivery tube 28 having one end in communication with the flow path from the flow tube 18 and the other end positioned to deliver fluid flowing therethrough into a plurality of collection tubes.

While in the embodiment of FIG. 1 the viewing station 12 is arranged to cooperate with a fraction collector not shown, it may be used for other purposes as well. Generally, it is useful in any application in which the optical characteristics of the fluid are to be determined and in which the fluid may be passed through such a viewing station. However, particular advantages are obtained from the use of the flow cell 10 in cooperation with chromatographic apparatus in which the effluent from the chromatographic column flows through the viewing station 12.

The optical detector 16 includes a photocell 30 and a compound optical filter 32, with the compound optical filter 32 being mounted between the photocell 30 and the viewing windows 22 and 24 so that the light from the source of illumination 14 shines through the viewing section 12 and onto the compound optical filter 32, resulting in a signal being received by the photocell 30.

As best shown in FIG. 2, the compound optical filter 32 includes an interference filter 33 having a quartz substrate 34, reflective layers 35, a layer of fluorescent phosphor 36 positioned on one surface of the interference filter 33, and an absorbance filter 38 positioned between the layer of fluorescent phosphor 36 and the photocell 30 so that light passing through the viewing station of the optical cell 10 passes through the interference filter 33 to impinge upon the layer of fluorescent phosphor 36, with radiation from the layer of fluorescent phosphor 36 passing through the absorbance filter 38 before impinging upon the photocell 30.

In the preferred embodiment, the reflective layers 35 of the interference filter 33 are located between the quartz substrate 34 and the layer of fluorescent phosphor 36, with the phosphor deposited directly upon the reflective layers so that a minimum of light is lost in substantially radial directions. However, the phosphor 36 may be positioned a short distance away, but in close proximity to the reflective layers 35 so that it reflectively overlies the reflective layers. By reflectively overlying it is meant that the ratio of the active area of the phosphor to the orthogonal distance between the phosphor and the surface of the reflective layers is sufficiently large to enable a significant portion of the light emitted from the phosphor toward the reflective layers to be reflected toward the photocell so as to aid in the purpose of the light emitted directly toward the photocell. In either position, light from the phosphor 36 is reflected from the reflective layers 35 of the interference filter to increase the efficiency of light transmitted to the photocell.

The efficiency of the filter is improved still further if fluorescent particles are embedded in a transparent matrix having a refractive index greater than that of air but less than that of the fluorescent particles. Under certain conditions, suitable matrices are glasslike, mixed sodium silicates or polyvinyl alcohol plastics.

The use of the transparent matrix partly reduces the scattering of light in the fluorescent layer 36. Under such a condition, light propagated over a long distance, such as in the plane of the layer 36, is scattered out of that plane. However, in the shorter distance perpendicular to the plane of the layer 36, the lower scattering power of the layer 36 results in less backscattering of light originating from fluorescence on the left side of surface 36 as shown in FIG. 2 and less backscattering of light reflected by the reflective interference layers 35.

Although the fluorescent particles and transparent matrix have been described as being a light source that serves as a filter element in a compound filter, the light source may be used for other purposes in which it has the advantage of emitting a large portion of its light in a direction orthogonal to the plane of the layer of phosphor particles in a direction away from the source of exciting light. The use of a transparent matrix in which the phosphor particles are embedded provides this advantage because less of the fluorescent light generated by the phosphor particles is backscattered so that more reaches the photocell to which it is directed.

If a transparent matrix is not used and the fluorexcent light is too strongly scattered, most of the fluorescent light leaves the filter in the direction of the incident exciting radiation and thus is wasted. This occurs because the intensity of the incident exciting radiation is greater on the substrate side of the light source since some of the exciting radiation is absorbed as it traverses the layer of phosphor particles. Thus, more fluorescent light is generated in the phosphor particles on the side away from the photocell than on the side adjacent to the photocell.

If a large portion of this generated fluorescent light is scattered, more light leaves the phosphor layer on the side away from the photocell than on the side adjacent to the photocell since the optical path through the scattering medium for the more strongly generated fluorescent light is shorter on the side away from the photocell. The transparent matrix reduces this backscattering so that almost as much of the fluorescent light leaves the phosphor layer on the side away from the incoming radiation (the photocell side) as leaves on the side upon which the incoming radiation impinges.

The characteristics of the interference filter 33 and the phosphor 36 are selected for the particular purpose of the optical cell 10. In a first embodiment, the interference filter 33 is selected to provide a narrow transmittance band to light, with the interference filter having a peak transmittance within this band to a wavelength substantially of 280 nanometers. The interference filter is also selected to cut off light having a wavelength longer than 254 nanometers.

In this embodiment the phosphor 36 is selected to have an emission band between approximately 500 and 540 nanometers which wavelength light is reflected from the reflective layers of the interference filter 33 in the direction of the photocell 30. With this arrangement, wht amount of light reflected to the photocell 30 is increased substantially, theoretically being more than twice as great as would be the case if the interference filter were not present or did not reflect light of the frequency emitted by the phosphor 36 and substantially greater than would be the case if the phosphor layer 36 did not include fine particles.

A suitable phosphor is manganese activated zinc silicate. Manganese activated zinc silicate does not fluoresce in response to exciting light of wavelengths much longer than 280 nanometers, thus removing the requirement for the interference filter to block wavelengths much longer than 280 nanometers. The light emitted by the phosphor is reflected by the interference filter since it has a longer wavelength than the longer cutoff wavelength of the interference filter.

In a second embodiment, the interference filter 33 is selected to provide a wider band of light transmittance, which band includes wavelengths of 254 nanometers as well as 280 nanometers. In this embodiment, the interference filter 33 reflects and absorbs light having a wavelength greater than 295 nanometers and shorter than 240 nanometers, and is included in a compound optical filter 32 with a layer 36 of phosphor having an excitation spectrum including both 254 nanometer and 280 nanometer wavelength light. The phosphor may be manganese activated zinc silicate which fluoresces and emits wavelengths of light between 500 and 540 nanometers. In the alternative the phosphor may be one of certain rare earth phosphors known to persons skilled in the art. These rare earth phosphors have an emission spectrum that is efficient in a narrow emission band located somewhere between 470 and 650 nanometers, which wavelength light is reflected by the interference filter towards a photocell 30, with the photocell being selected to have a high sensitivity to the narrow emission band of the phosphor.

In a third embodiment, the interference filter transmits light of 313 nanometers but not 254 nanometers. In this embodiment, a rare earth phosphor, coated on the filter, is utilized as a fluorescent material 36. Rare earth phosphors are available having a high efficiency in emitting light in a narrow emission band located somewhere between 470 and 650 nanometers when receiving light within a range that includes light having wavelengths of 313 nanometers and shorter. The light emitted by each rare earth phsophor is also reflected from the interference filter. When this embodiment of filter is utilized, the photocell 30 is selected to have a high sensitivity to the narrow emission band of the rare earth phosphor.

In the second embodiment, the light source 14, shown as a lamp for purposes of illustration in FIG. 1, includes a low pressure mercury lamp that emits light having maximum intensity at a wavelength of 254 nanometers or a fluorescent light source that emits 280 nanometer light but not 254 nanometer light. Such a fluorescent light source is disclosed in U.S. Pat. No. 3,463,927 issued Aug. 26, 1969. The compound optical filter 32 transmits light to the photocell in response to 280 nanometer light from the fluorescent light source and in response to 254 nanometer light from the mercury lamp.

Generally, the compound optical filter 32 must include an interference filter 33 which transmits light of a frequency in the excitation spectrum of the phosphor 36, which frequency of light interacts with a fluid to reveal a characteristic of the fluid to be measured, and must reflect light within the emission spectrum of the phosphor 36. Preferably, the transmission band of the interference filter 33 is in a frequency range that includes the most efficient excitation frequency of the phosphor 36 and also may have a cut off point for frequencies of light higher and lower than the frequency of light that interacts with the fluid. The filter 38, which is generally an absorbance filter, is selected to remove any further stray light passing through the interference filter 33.

In the operation of the optical unit 10 to measure the light transmittance or absorbance of the effluent from a chemical analyzer such as a density gradient column, light is obtained at least one wavelength of which varies in intensity proportionally to the transmittance or absorbance of the effluent from the density gradient column through which it is transmitted. Noise or error signals relating to undesired wavelengths are removed from the light transmitted through the effluent and an electrical signal is generated in response to the light which signal is proportional to the tramsmittance or absorbance of the fluid.

To obtain light at at least one spectral region which varies in proportion to the transmittance or absorbance of the fluid leaving the density gradient column, the effluent is forced upwardly through the flow tube 18 of the flow cell 12 between the windows 22 and 24 of the optical unit and through the delivery tube 28. One manner of moving the fluid is to insert a more dense liquid at the bottom of the density gradient column to force the fluid through the tube 18, as described in U.S. Pat. No. 3,151,639 to Robert W. Allington.

As the fluid flows past the windows 22 and 24 of the optical cell, light from the source of light 14 passes through the windows 22 and 24 and through the fluid to scan the fluid from the density gradient column. The light emitted by the low-pressure mercury lamp 14 is primarily ultraviolet light having high intensity in wavelengths that are in the vicinity of 24 nanometers although other light sources providing light of different wavelengths are used in some applications. These wavelengths are of special interest in monitoring the fluid from certain chemical analyzers such as density gradient columns and chromatographic columns.

As the fluid flows through the flow cell, light from the source of light 14 is absorbed by the fluid in proportion to the concentration of solute within the fluid, resulting in light impinging upon the optical detector 16 which varies inversely with the concentration of the solute within the fluid from the chromatographic column. The light impinging upon the optical detector 16 indicates zones of the fluid in which the solute is of particular interest.

To remove error signals from the light impinging on the optical detector 16, the interference filter 33 of the compound optical filter 32, reflects and absorbs light having wavelengths shorter or longer than the wavelengths of the light being used to measure the absorbance or transmittance of the fluid. In one embodiment, the interference filter 33 passes light substantially of the wavelength of 280 nanometers and prevents light having shorter wavelengths from passing. This embodiment is particularly useful with the fluorescent light source described in U.S. Pat. application No. 259,868 filed June 5, 1972. In another embodiment, the interference filter 33 transmits light across a wider band including light having wavelengths of 254 or 280 nanometers and prevents light of longer or shorter wavelengths from passing.

The phosphor 36 is excited by the light of 254 nanometers or 280 nanometers, depending on the embodiment of the invention being utilized, and responds by emitting light of a longer wavelength, which in the preferred embodiment is between 500 nanometers and 540 nanometers. The light is emitted in all directions, with some portion of it passing through the absorbance filter 38 to the to the photocell 30 in a direct path and other portions of the light being reflected from the reflective layers of the interference filter 34.

Since the wavelength of the light is above the cut off frequency of the interference filter 33, it is not transmitted toward the windows 22 and 24 but is reflected back through the absorbance filter 38 to the photocell 30, reinforcing light emitted directly in that direction. Because the phosphor layer 36 is adjacent to the interference filter 33, only a small portion of the light is emitted at an angle transverse to the line between the interference filter 33, the absorbance filter 38, and the photocell 30, a majority of the light being either emitted in the direction of the photocell 30 or in the opposite direction, with the light being emitted in the opposite direction being reflected toward the photocell 30.

To improve the efficiency of the compound optical filter 10, the phosphor material 36 is particulate. This type of phosphor reduces the amount of light lost by propagation in directions close to the plane of the phosphor element 36. This reduction in loss occurs because the light propagated in this plane is scattered in multiple directions by the particles so as to increase the amount of light in a direction transverse to the plane. A large portion of the light reflected in a direction transverse to the plane is reflected by the interference layers 35 in the direction of the photocell 30 thus increasing the amount of useful light emitted from the phosphor layer 36 over what could be used with a material that was not of a particulate nature.

In one embodiment, the compound optical filter is utilized with a light source that includes microcrystalline lanthanum fluoride with cerium activation. This type of light source provides light having a central wavelength slightly longer than desired in certain studies. The fluorescent particles of the compound optical filter when embedded in the transparent matrix, shifts the central frequency to one that is better suited for the studies.

The filter 38 is selected to remove any other stray light from the light emitted by the phosphor 36 before the light is passed to the photocell 30. The photocell 30 converts the light to an electrical signal, which may be used to control the operation of a fraction collector such as that disclosed in the aforementioned U.S. Pat. No. 3,202,188.

The light source and the compound optical filter have the advantage of utilizing a larger portion of the light emitted by the fluorescent particles because: (1) the backscattering of fluorescent light as it is emitted by the phosphor is reduced by the transparent matrix in which the particles are embedded, thus allowing more light to reach the photocell directly; and (2) the portion of fluorescent light that is reflected by the reflective layers of the interference filter is backscattered less, so that more reaches the photocell. It has a further advantage when used in an embodiment of optical scanners that may be utilized to scan protein solutions using a light source which provides a wavelength of light to the optical filter that has a central wavelength slightly longer than the wavelength that is desired because the central wavelength is shifted to a shorter wavelength than would be the case if no transparent matrix were used.

Although preferred embodiments of the invention have been described with some particularity, many modifications and variations of the inventions are possible in the light of the above teachings. It is therefore to be understood that within the scope of the appended claims, the invention may be practiced otherwise than as specifically described.

What is claimed is:

1. An apparatus for emitting light of a first wavelength in a predetermined direction in response to light of a second wavelength, comprising:
   transducer means for emitting light of said first wavelength when excited by light of said second wavelength;
   said transducer means including means for emitting light of said first wavelength in at least one direction other than said predetermined direction:
   said transducer means including controlled light scattering means for changing the direction of at least some of said light emitted in said one direction other than said predetermined direction to said predetermined direction and light-propagation means for reducing the amount of light of said first wavelength traveling in said predetermined direction that is scattered into other directions by said controlled light-scattering means;
   said light-propagation means including means for reducing the backscattering of light of said second wavelength.

2. Apparatus according to claim 1 in which said transducer means includes a phosphor having an excitation spectrum into which said second wavelength falls.

3. Apparatus according to claim 2 in which:
   said phospor includes a plurality of small phosphor particles; and
   said light-propagation means includes a transparent matrix having a refractive index greater than that of air and less than that of said small particles.

4. Apparatus according to claim 3 in which said phosphor is manganese activated zinc silicate.

5. Apparatus according to claim 4 in which said transducer matrix is a sodium silicate.

6. Apparatus according to claim 4 in which said transparent matrix is polyvinyl alcohol.

7. Apparatus according to claim 4 in which said phosphor is activated by a rare earth element.

8. Apparatus according to claim 7 in which said transparent matrix is a polyvinyl alcohol.

9. Apparatus according to claim 7 in which said transparent matrix is a sodium silicate.

10. Apparatus according to claim 2 in which:
    said controlled light-scattering means includes a plurality of small phosphor particles; and
    said light-propagation means includes a transparent matrix in which said small particles are embedded having a refractive index greater than that of air and less than that of said small particles.

* * * * *

UNITED STATES PATENT OFFICE
CERTIFICATE OF CORRECTION

Patent No. 3,866,049         Dated June 10, 1975

Inventor(s) Robert W. Allington

It is certified that error appears in the above-identified patent and that said Letters Patent are hereby corrected as shown below:

Column 1, line 24, "impringes" is changed to --impinges--.

Column 1, line 32, "wavel-" is changes to --wave- --.

Column 2, line 8, ":" is changed to --,--.

Column 2, line 13, "abandoned." is changed to --abandoned,--.

Column 2, line 13, "this" is changed to --these--.

Column 2, line 33, after "by" insert --:--.

Column 3, line 46, after "is" insert --:--.

Column 5, line 4, "manometers" is changed to --nanometers--.

Column 7, line 15, "fluorexcent" is changed to --fluorescent--.

Column 7, line 51, "wht" is changed to --the--.

Column 8, line 31, "phsophor" is changed to --phosphor--.

Column 9, line 6, "tramsmittance" is changed to --transmittance--.

Column 9, line 24, "24 nanometers" is changed to --254 nanometers--.

Column 9, line 62, before "photocell" delete "to the".

UNITED STATES PATENT OFFICE
CERTIFICATE OF CORRECTION

Patent No. 3,866,049          Dated June 10, 1975

Inventor(s) Robert W. Allington

It is certified that error appears in the above-identified patent and that said Letters Patent are hereby corrected as shown below:

Column 9, line 64, "34" is changed to --33--.

Column 10, line 29, after "than" insert "that".

Column 11, line 9, ":" is changed to --;--.

Column 12, line 12, "4" is changed to --3--.

Signed and Sealed this eighth Day of June 1976

[SEAL]

Attest:

RUTH C. MASON
*Attesting Officer*

C. MARSHALL DANN
*Commissioner of Patents and Trademarks*